US007519914B2

(12) United States Patent
Fernandez et al.

(10) Patent No.: US 7,519,914 B2
(45) Date of Patent: *Apr. 14, 2009

(54) EXTENSIBLE SCHEME FOR DEFINING THE VISUAL APPEARANCE OF COMPUTER SYSTEM COMPONENTS

(75) Inventors: Roland L. Fernandez, Woodinville, WA (US); Christopher A. Evans, Sammamish, WA (US); Richard W. Stoakley, Seattle, WA (US); Gregory L. Raiz, Bellevue, WA (US); Aaron B. Tinling, Seattle, WA (US); Scott R. Hanggie, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 534 days.

This patent is subject to a terminal disclaimer.

(21) Appl. No.: 10/955,227

(22) Filed: Sep. 30, 2004

(65) Prior Publication Data

US 2005/0044504 A1 Feb. 24, 2005

Related U.S. Application Data

(63) Continuation of application No. 09/825,518, filed on Apr. 3, 2001, now Pat. No. 6,886,135.

(60) Provisional application No. 60/196,005, filed on Apr. 7, 2000.

(51) Int. Cl.
*G06F 3/00* (2006.01)
*G06F 3/048* (2006.01)

(52) U.S. Cl. ........................... 715/762; 715/765
(58) Field of Classification Search ................ 715/762, 715/765, 826, 243
See application file for complete search history.

(56) References Cited

U.S. PATENT DOCUMENTS

| | | | |
|---|---|---|---|
| 5,603,034 A * | 2/1997 | Swanson | 717/111 |
| 6,091,411 A | 7/2000 | Straub et al. | |
| 6,104,391 A | 8/2000 | Johnston, Jr. et al. | |
| 6,188,399 B1 | 2/2001 | Voas et al. | |
| 6,392,671 B1 * | 5/2002 | Glaser | 715/765 |
| 6,466,228 B1 | 10/2002 | Ulrich et al. | |
| 6,751,776 B1 * | 6/2004 | Gong | 715/500.1 |

* cited by examiner

*Primary Examiner*—Kieu D Vu
(74) *Attorney, Agent, or Firm*—Shook, Hardy & Bacon LLP (57) ABSTRACT

A system theme schema file format includes declarations of enumerations, properties, control parts, and control part states for providing extensible theming of the visual appearance of a computer operating system's user interface components. Custom theme schema files can extend the system theme schema by adding declarations of custom enumerations, custom properties, custom control part, and custom control part states, thereby participating in theming of the visual appearance of components of the computer's operating system. The schema files establish the allowable form and content of data that specifies how user interface components should be displayed in accordance with particular themes. Themes are defined and user interface components are displayed by the operating system in accordance with the information specified in the schema files.

10 Claims, 4 Drawing Sheets

EXTENSIBLE SCHEME FOR DEFINING THE VISUAL APPEARANCE OF COMPUTER SYSTEM COMPONENTS

CROSS-REFERENCE TO RELATED APPLICATION

This application is a continuation of U.S. application Ser. No. 09/825,518 filed Apr. 3, 2001 which claims priority to provisional U.S. Application Ser. No. 60/196,005, filed Apr. 7, 2000, both of which are incorporated herein by reference.

TECHNICAL FIELD

The present invention relates generally to graphical user interfaces for computer systems. More particularly, the invention provides a system and method for defining an extensible taxonomy for graphic user controls and their visual display theme properties separately from the executable graphical user interface software.

BACKGROUND OF THE INVENTION

Changing the way graphical user interface components of a computer system are displayed provides computer system users with a more visually exciting experience. This modification of the appearance of user interface components is commonly referred to as skinning.

Conventional skinning techniques, however, have various shortcomings. For instance, conventional skinning techniques typically define hard coded finite sets of controls in which the executable code that displays user interface components is intertwined with the data that specifies how the components should be displayed. This often leads to compatibility and performance problems between user applications and a computer's operating system. Further, modification of the appearance of system components undesirably requires modification of executable code.

Accordingly, there is a need for improved techniques for facilitating modification of the visual appearance of user interface components.

SUMMARY OF THE INVENTION

A system and method in accordance with the present invention overcomes the foregoing shortcomings of conventional operating system techniques for modifying the visual appearance of user interface components. A system theme schema file, in accordance with the present invention, includes declarations of enumerations, properties, controls, control parts, and control part states for providing extensible theming of the visual appearance of a computer operating system's user interface components.

The schema file allows new standard and custom controls, parts, states, and properties to be added to the a system for themeing user interface components without having to update other themeing system components, such as a theme authoring file parser, a theme loader, and/or a theme runtime property manager, which perform various functions to facilitate themeing of user interface components, including, but not limited to, parsing a schema file, parsing a theme specification file, building a binary version of a theme into shared memory, notifying running processes that a theme is active, and searching for, and returning, a theme handle that can be used to invoke theme drawing and information services (API's) to draw parts of a control.

Advantageously, custom theme schema files can extend the system theme schema by adding declarations of custom enumerations, custom properties, custom controls (along with their parts and states), thereby participating in theming of the visual appearance of various user interface components of the computer's operating system. The system and custom schema files establish the allowable form and content of data that specifies how user interface components should be displayed in accordance with particular themes. Themes are defined and applied to user interface components in accordance with the information specified in the schema files.

Additional features and advantages of the invention will be apparent upon reviewing the following detailed description.

DETAILED DESCRIPTION OF THE INVENTION

Figure 4:
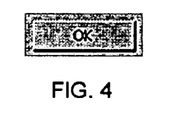
FIGS. 4-8 show a user interface button in various example states.
Figure 5:
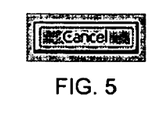
Figure 6:
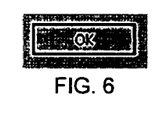
Figure 7:
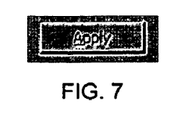
Figure 8:
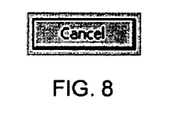

As mentioned above, in order to provide a visually exciting experience to the user of a computer operating system, it is desirable to provide a way to change the appearance of system components. A button, such as the button depicted in FIG. 4 is an example of such a system component. Other user interface components for which the component's appearance may be changed according to certain inventive principles, include, but are not limited to, scrollbars, checkboxes, list views, tab controls, status bars, toolbars, headers, combination boxes, edit controls, progress controls, track bars, hyperlinks, tree views, group boxes, splitters, places bars, balloon tips, up and down controls, drag lists, and the like.

Modifying the appearance of such user interface components, also referred to herein as system components, is commonly referred to as "skinning." A theme schema file in accordance with certain inventive principles describes properties used by an operating system's drawing and information application programming interfaces (API's) and by theme-aware controls. The term schema refers generally to meta-data, which is data describing other data. A schema generally defines the various parts and aspects of other data, in this case, the various parts and aspects of data that are allowable in a theme authoring file.

Standard properties, controls, and control-specific parts, states, and custom properties may be defined in accordance with the schema file format such that this information can be referred to in the theme authoring files, the theme manager API's, and the theme aware drawing code. Properties generally refers herein to standard and custom rendering properties of user interface components, such as background image filename, text color, text font, and the like.

In order to allow the appearance of controls to be defined separately from the control code itself and for additional Skemes (Skin Themes) to be defined and distributed separately from the operating system, a Skeme definition file format is desirable. Following a description of an example environment in which certain inventive principles may be implemented, various inventive aspects will be described in the context of theme schema file format for use in a "WINDOWS®" operating system environment. Various aspects of the invention may also be used in other operating systems including Apple Computer's operating systems, Unix-based operating systems, and other operating systems.

Figure 1:
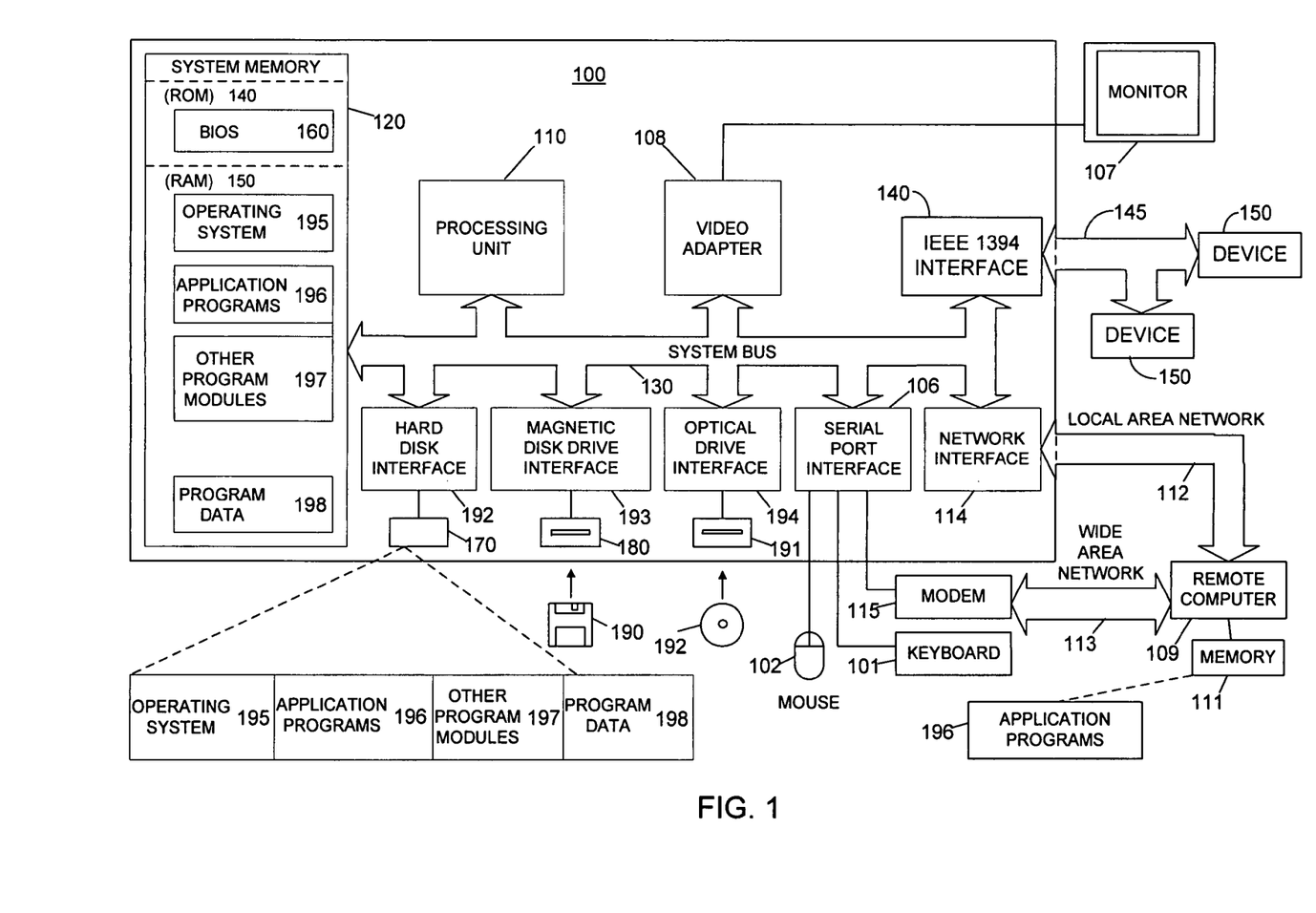
FIG. 1 is a schematic block diagram of a conventional general-purpose digital computing environment that can be used to implement various aspects of the present invention.

FIG. 1 is a schematic diagram of a conventional general-purpose digital-computing environment that can be used to implement various aspects of the present invention. A computer 100 includes a processing unit 110, a system memory 120 and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for the computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. In particular, the RAM 150 will, from time to time, store various device drivers, as known in the art. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 typically includes at least some of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to local network 112 through a network interface or adapter 114. When used in a WAN networking environment, the computer 100 and remote computer 109 may both include a modem 115 or other means for establishing a communications over wide area network 113, such as the Internet. The modem 115, which may be internal or external, is connected to system bus 130 via the serial port interface 106. In a networked environment, program modules depicted relative to the computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server. Procedures of the present invention to be described below can operate within the environment of the computer 100 shown in FIG. 1. Although the invention is generally applicable to a computer operating in accordance with the IEEE 1394 standard, it is not intended to be so limited.

Figure 2:
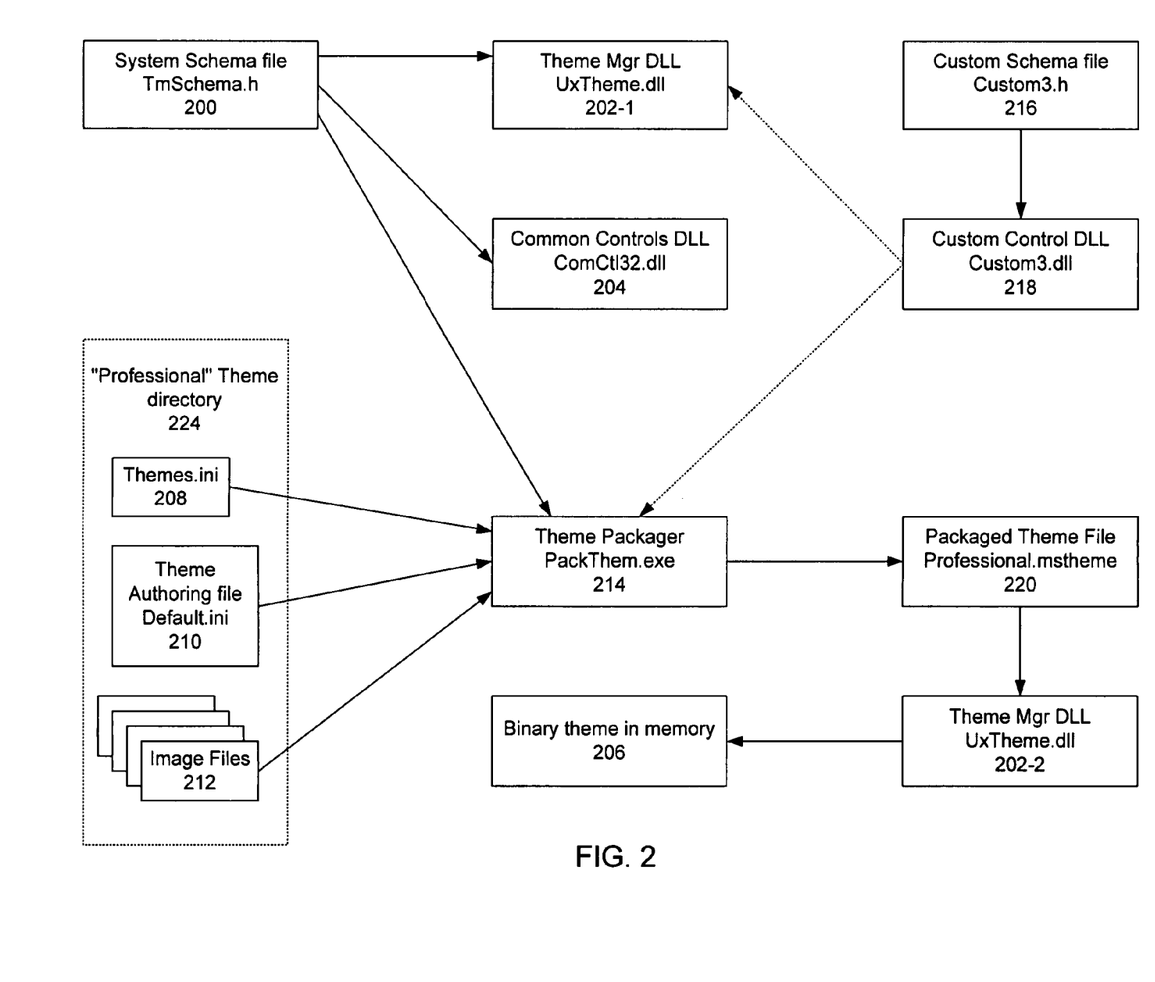
FIG. 2 is a simplified schematic block diagram showing interaction between schema files and other computer system modules according to various inventive principles.

FIG. 2 is a simplified block diagram depicting relationships among various files in accordance with various inventive principles. System theme schema file 200, which is named TmSchema.h" in FIG. 2, may be a "C" programming language header file. As described in more detail below, the system schema file may define a common set of enumerations, properties, class names, class parts, and class states that specify an allowable form and/or an allowable content for system or base theme related data to be shared among various modules for displaying user interface or system components in accordance with the system theme schema.

The first part of the system schema file may contain some fixed information such as definitions of various constants. This first part of the system schema file may also include a header file defining macros, constants, and structures useful for simplifying and increasing the readability of the system schema file. The contents of an example of such an include file, which may be named SchemaDef.h, are reproduced below:

```
//-----------------------------------------------------------
// SchemaDef.h - defines needed to build a Theme Manager schema
//      file
//-----------------------------------------------------------
#ifndef SCHEMA_STRINGS      // FIRST PASS of this hdr file
//-----------------------------------------------------------
#ifndef SCHEMADEF_H
#define SCHEMADEF_H
//-----------------------------------------------------------
#define SCHEMADEF_VERSION 1 // defines the exported func(s) implemented
//-----------------------------------------------------------
struct TMPROPINFO
{
    LPCWSTR pszName;
```

```
    SHORT sEnumVal;
    BYTE bPrimVal;
};
//---------------------------------------------------------------
struct TMSCHEMAINFO
{
    DWORD dwSize;        // size of this struct
    int iSchemaDefVersion;    // version number from this file
    int iThemeMgrVersion;     // version number from "thschema.h"
    int iPropCount;       // # of entries in prop table
    const struct TMPROPINFO *pPropTable;    // ptr to prop table
};
//--------------------------------------------------------------------------
#define BEGIN_TM_SCHEMA(name)
#define BEGIN_TM_PROPS( )       enum PropValues { DummyProp = 49,
#define BEGIN_TM_ENUM(name)     enum name {
#define BEGIN_TM_CLASS_PARTS(name)    enum name##PARTS {
    name##PartFiller0,
#define BEGIN_TM_PART_STATES(name)    enum name##STATES {
    name##StateFiller0,
#define TM_PROP(prefix, name, primval) prefix##_##name,
#define TM_ENUM(prefix, name)   prefix##_##name,
#define TM_PART(prefix, name)   prefix##_##name,
#define TM_STATE(prefix, name)  prefix##_##name,
#define TM_PARTVAL(prefix, name, val) prefix##_##name = val,
#define END_TM_CLASS_PARTS( )     };
#define END_TM_PART_STATES( )     };
#define END_TM_PROPS( )       };
#define END_TM_ENUM( )        };
#define END_TM_SCHEMA(name)
//-----------------------------------------------------------------------------
#endif    // SCHEMADEF_H
//--------------------------------------------------------------------------
#else        // SECOND PASS of this hdr file
//--------------------------------------------------------------------------
#undef BEGIN_TM_SCHEMA
#undef BEGIN_TM_PROPS
#undef BEGIN_TM_ENUM
#undef BEGIN_TM_CLASS_PARTS
#undef BEGIN_TM_PART_STATES
#undef TM_PROP
#undef TM_PART
#undef TM_STATE
#undef TM_PARTVAL
#undef TM_ENUM
#undef END_TM_CLASS_PARTS
#undef END_TM_PART_STATES
#undef END_TM_PROPS
#undef END_TM_ENUM
#undef END_TM_SCHEMA
//--------------------------------------------------------------------------
#define BEGIN_TM_SCHEMA(name)     static const TMPROPINFO name[ ] = {
#define BEGIN_TM_PROPS( )
#define BEGIN_TM_ENUM(name)       {L#name, TMT_ENUMDEF,
    TMT_ENUMDEF},
#define BEGIN_TM_CLASS_PARTS(name)    {L#name L"PARTS",
    TMT_ENUMDEF, TMT_ENUMDEF},
#define BEGIN_TM_PART_STATES(name)    {L#name L"STATES",
    TMT_ENUMDEF, TMT_ENUMDEF},
#define TM_PROP(prefix, name, primval)    {L#name, prefix##_##name,
    TMT_##primval},
#define TM_PART(prefix, name)    {L#name, prefix##_##name,
    TMT_ENUMVAL},
#define TM_STATE(prefix, name)   {L#name, prefix##_##name,
    TMT_ENUMVAL},
#define TM_PARTVAL(prefix, name, val)    {L#name, prefix##_##name,
    TMT_ENUMVAL},
#define TM_ENUM(prefix, name)    {L#name, prefix##_##name,
    TMT_ENUMVAL},
#define END_TM_CLASS_PARTS( )
#define END_TM_PART_STATES( )
#define END_TM_PROPS( )
#define END_TM_ENUM( )
#define END_TM_SCHEMA(name)       }; \
    static const TMSCHEMAINFO *GetSchemaInfo( ) \
    { \
      static TMSCHEMAINFO si = {sizeof(si)}; \
      si.iSchemaDefVersion = SCHEMADEF_VERSION; \
      si.iThemeMgrVersion = THEMEMGR_VERSION; \
```

```
    si.iPropCount = sizeof(name)/sizeof(name[0]); \
    si.pPropTable = name; \
   \
    return &si; \
  }
//-----------------------------------------------------------------
#endif
//-----------------------------------------------------------------
```

In accordance with various inventive principles, both strings and enumeration values for each listed property are defined in a single table using a special two-pass include technique. Conventionally, such strings and enumeration values must be defined in two separate, but similar, tables, which undesirably get out of sync and "break" when the separate tables are not uniformly updated. This two-pass, single table technique advantageously calls for maintenance of only a single occurrence of each property while providing the benefit of having two tables, including increased readability of the system schema file and related files. An example of a beginning portion of a theme manager schema file, TmSchema.h, in accordance with various inventive principles, is set forth below:

The system schema file may also include a section defining a set of properties based on primitive data types or based on a previously declared enumeration. In order to work with the previously mentioned included macro definitions, this section may include a line at the beginning of this section that says, "BEGIN_TM_PROPS ( )" and a line at the end of this section that says "END_TM_PROPS ( )." An example property definition is:

TM_PROP(TMT, BORDERSIZE, INT)

This example property definition declares a "BorderSize" property of type "int." Another example property definition is: TM_PROP(TMT, BGTYPE, ENUM)

```
//-----------------------------------------------------------------
// TmSchema.h - Theme Manager schema (properties, parts, etc)
//-----------------------------------------------------------------
// Note: this file is normally #include-ed twice a single .cpp
//       file. The 2nd time, SCHEME_STRINGS should be defined.
//       This allows the enums and strings to be kept in a
//       single logical table and ensure they stay in sync with
//       each other.
//-----------------------------------------------------------------
#if (defined(SCHEMA_STRINGS)) || (! defined(TMSCHEMA_H))
//-----------------------------------------------------------------
#define TMSCHEMA_H
//-----------------------------------------------------------------
#include "SchemaDef.h"
//-----------------------------------------------------------------
#define THEMEMGR_VERSION 1    // increment if order of props changes or
                              // any props are deleted (will prevent
    loading
                              // of controlsets that use older version
//-----------------------------------------------------------------
BEGIN_TM_SCHEMA(ThemeMgrSchema)
//-----------------------------------------------------------------
// TM_ENUM (also declared in PROPERTIES section)
//-----------------------------------------------------------------
```

Following the beginning portion of the system schema file, the system schema file may then define enumerations having an enumeration name and a set of named values. An example enumeration definition is:

```
          BEGIN_TM_ENUM(BGTYPE)
              TM_ENUM(BT, IMAGEFILE)
              TM_ENUM(BT, BORDERFILL)
              TM_ENUM(BT, NTLFILE)
          END_TM_ENUM( )
```

This example declares an enumeration called "BGTYPE" that has 3 named values: IMAGEFILE (value=0), BORDERFILL (value=1), and NTLFILE (value=2).

This example property definition declares a "BgType" property of type "enum."

When the schema file is compiled, each property will be assigned an enumeration value (e.g., the property "Border-Size" would be represented by the enum symbol "TMT_BORDERSIZE" whose value would be "2403") that can be used both by the control code as well as the theme rendering code, to exchange information about standard or custom properties that may appear in the runtime theme file.

Also, when the schema file is compiled in the theme manager, each property will produce an entry into the theme loader's symbol table, describing the name, enumeration number, and type of the property.

The system schema file may also include a section containing the name of user interface control classes, along with their part and state declarations, also referred to herein as declarations or definitions of parts and states. An example parts declaration is:

```
BEGIN_TM_CLASS_PARTS(BUTTON)
    TM_PART(BP, PUSHBUTTON)
    TM_PART(BP, RADIOBUTTON)
    TM_PART(BP, CHECKBOX)
    TM_PART(BP, GROUPBOX)
    TM_PART(BP, USERBUTTON)
END_TM_CLASS_PARTS( )
```

This example defines a class called "button" that has the 5 specified parts.

An example declaration of part states is:

```
BEGIN_TM_PART_STATES(PUSHBUTTON)
    TM_STATE(PBS, NORMAL)
    TM_STATE(PBS, HOT)
    TM_STATE(PBS, PRESSED)
    TM_STATE(PBS, DISABLED)
    TM_STATE(PBS, DEFAULTED)
END_TM_PART_STATES( )
```

This example defines a part called "pushbutton" that has the 5 specified states. Five example buttons in possible renderings of these respective states are shown in FIGS. 4-8. Of course, other suitable renderings of these states are also possible.

Following the parts and states definitions, the system schema file may have an ending section containing the following:

END_TM_SCHEMA(xxx)

where "xxx" is the schema name.

The enumerations, properties, and control parts and control part states, as described above, establish, in a sense, a vocabulary that may be used in a theme authoring file to specify how various controls, which may include one or more parts, should look according to a particular theme.

Figure 3:
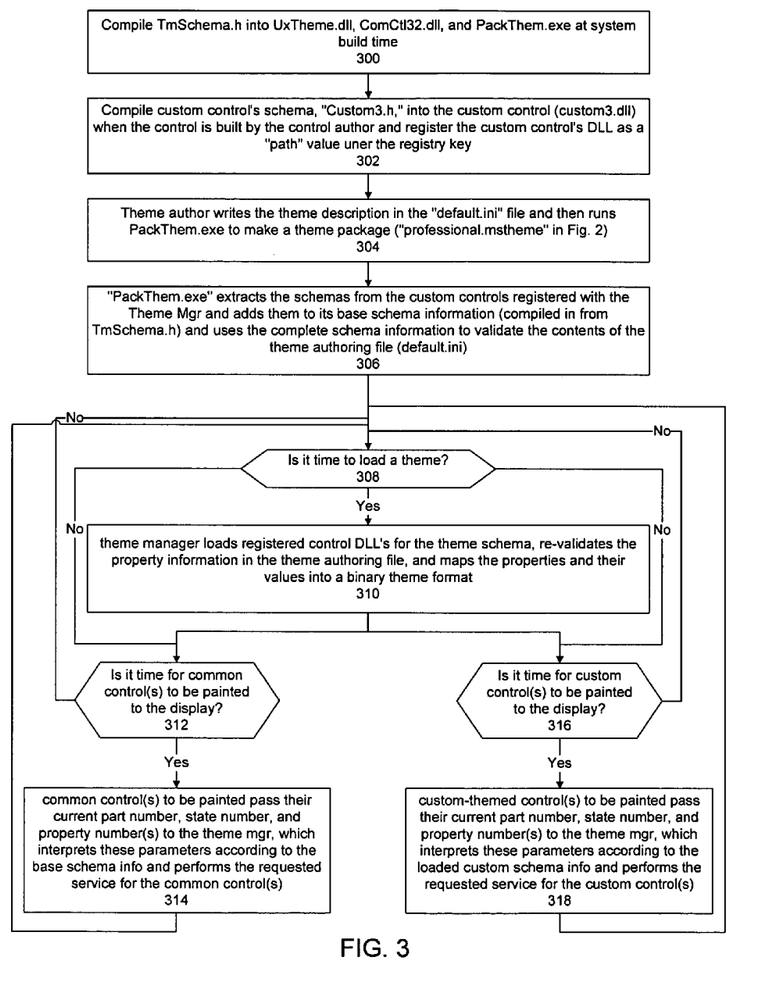
FIG. 3 is a flow chart of simplified steps for implementing various aspects of the invention.

Referring to FIGS. 2 and 3, in accordance with certain inventive principles, system schema file (TmSchema.h) 200 is compiled into: theme manager DLL (UxTheme.dll) 202-1, common controls DLL (ComCtl32.dll) 204, and theme packager (PackThem.exe) 214. This may occur at system build time, as depicted at step 300 in FIG. 3. System schema file (TmSchema.h) 200 may also be compiled into computer operating system code and/or third-party custom control code (DLL, LIB, or EXE files).

According to certain inventive principles, a control author may define a custom theme schema, which may be contained in custom schema file (Custom3.h) 216. The custom schema may define enumerations, properties, parts, and states in addition to those defined in the system schema file, thereby effectively extending the system or base theme schema. The custom theme schema may then be compiled into one or more custom themed controls, such as custom control DLL (Custom3.dll) 218, as depicted in FIG. 2 and at step 302 in FIG. 3. The custom control DLL may be registered as a "path" value under the registry key:

HKEY_LOCAL_MACHINE\Software\Microsoft\Windows\CurrentVersion\ThemeManager\CustomControls.

An example path is: "c:\program files\acme\keypad.dll".

A theme author may then create a theme description (Default.ini) 210, also referred to herein as the theme authoring file. Package theme file (custom3.mstheme) 220 may then be generated by theme packager (PackThem.exe 214) in accordance with the system theme schema, the custom theme schema, and the theme description, as depicted at step 304. As part of generating the packaged theme file, the theme packager may extract schemas from custom controls registered with the theme manager. The theme manager may then validate the contents of the theme authoring file based upon the contents of both the system schema information and the custom schema information, as depicted at step 306. This may be accomplished in part by the theme packager attempting to call registered custom control DLL's to get their respective custom theme schema information. According to certain inventive principles, the theme packager implements these DLL calls automatically when the system theme schema file and any custom theme schema files are built in accordance with the example schema file format set forth above.

At step 308, a determination is made as to whether it is time to load a theme. A theme may be loaded upon starting an operating system and when a user indicates that a change is desired from a current theme to a different theme. At step 310, when it is time to load a theme, the theme manager loads registered custom control DLL's, re-validates the property information in the theme authoring file, and maps the properties and their values into a binary theme format 206 (FIG. 2).

As depicted at steps 312 and 314, when it is time to display a common control, information, such as the common control's properties, part information, and state information, is passed to the theme manager. The theme manager interprets this information and displays the common control in accordance with the base schema defined in the system schema file.

Similarly, as depicted at steps 316 and 318, when it is time to display a custom control, information, such as the custom control's properties, part information, and state information, is passed to the theme manager. The theme manager interprets this information and displays the custom control in accordance with the custom schema loaded from the control at load time.

What has been described above is merely illustrative of the application of the principles of the present invention. Those skilled in the art can implement other arrangements and methods without departing from the spirit and scope of the present invention. Any of the methods of the invention can be implemented in software that can be stored on computer disks or other computer-readable media. No claim should be interpreted to be in means plus function format. Numbered steps in method claims should not be interpreted to require a particular ordering of the steps.

We claim:

1. An extensible schema stored as computer-executable instructions on a computer readable medium for defining a respective visual appearance for a plurality of computer system components in accordance with a user interface skin theme, the schema comprising:

a system schema file containing skin-theme metadata that describes allowable form and content of theme-authoring data that defines at least one display attribute for at least one user interface component, the system schema file including at least one definition of a plurality of user interface parts, wherein the system schema file comprises:

(1) a theme packager for generating a package theme file based on system theme schema, defined custom theme schema, and a theme authoring file, wherein the theme packager validates the contents of the theme authoring file based on the contents of the system schema file and the contents of the defined custom theme schema; and (2) a theme manager for re-validating the contents of a theme authoring file;

the system schema file including a definition of a plurality of user interface part states corresponding to at least a respective one of the user interface parts; and the theme authoring file comprising at least one custom theme schema file for extending the system theme schema by adding at least one of: declarations of custom enumerations, custom properties, custom control parts, and custom control part states.

2. The schema of claim 1 wherein the system schema file further comprises a definition of a common set of enumerations for shared use by a plurality of modules that cooperate to display the graphical user interface in accordance with the skin theme.

3. The schema of claim 2 wherein the system schema file includes a common set of properties defined based at least in part on at least one of the common enumerations.

4. The schema of claim 3 wherein strings and enumeration values for a plurality of the properties are defined in a single table using a two-pass include technique.

5. The schema of claim 4 wherein at least one of the plurality of modules is selected from the groups consisting of: a theme manager, a theme-authoring file, and at least one theme-aware control.

6. The schema of claim 5 wherein:

at least one of the at least theme-aware control is a custom theme-aware control that specifies allowable form and content of data in a custom schema file;

the custom schema file including at least one definition of a plurality of customer interface parts; and the custom schema file including a definition of a plurality of user interface part states corresponding to at least a respective one of the custom user interface parts.

7. The schema of claim 6 wherein the custom schema file is compiled into a dynamic link library of the custom theme-aware control.

8. A method of using at least one schema file for theming the appearance of a computer operating system user interface, the method comprising the steps of:

defining system skin theme metadata in system schema file, where the system skin theme metadata describes allowable form and content of system theme authoring data;

defining custom skin theme metadata in a custom schema file;

using the system theme authoring data to describe at least one system theme in accordance with the system skin theme metadata thereby generating at least one system theme description;

describing at least one custom theme in accordance with the custom skin theme metadata, wherein the custom theme consists of a custom theme schema file for extending the system theme schema by adding at least one of: declarations of custom enumeration, custom properties, custom control parts, and custom control part states;

generating a packaged theme file based at least in part upon the at least one system-theme description and custom theme description;

validating the at least one system theme description based on the system skin theme metadata and validating the at least one custom theme based on the custom skin theme metadata, wherein validating automatically occurs when either the at least one system theme description or at least one custom theme are built;

verifying that the at least one system theme complies with the system skin theme metadata, wherein said verification occurs when a determination is made that it is time to load a theme;

verifying that the at least custom theme complies with the system skin theme metadata, wherein said verification occurs when a determination is made that it is time to load a theme; and loading the packaged theme file into memory of the computer.

9. A computer-readable storage medium storing thereon computer-executable instructions for theming the appearance of a computer operating system user interface by performing steps comprising:

defining system skin theme metadata in a system schema file, wherein the system skin theme metadata describes allowable form and content of system-theme-authoring data;

defining custom skin theme metadata in a custom schema file, wherein the custom skin theme metadata includes at least one of: declarations of custom enumeration, custom properties, custom control parts, and custom control part states;

using the system-theme authoring data to describe at least one system theme in accordance with the system skin theme metadata and custom skin theme metadata, thereby generating at least one system-theme description;

using the system skin theme metadata and custom skin theme metadata to validate the at least one system-theme description, wherein said validation occurs automatically when the at least one system-theme description is built;

generating the packaged theme file based at least in part upon the at least one custom theme;

re-validating property information in the packaged theme file when a determination is made that it is time to load a theme; and loading the packaged theme file into memory of the computer.

10. A computer system comprising computer-readable instruction stored on a computer storage medium, such computer-readable instruction defining an extensible schema for defining a respective visual appearance for a plurality of computer system components in accord with a user interface skin theme, the schema comprising:

a system schema file contain skin-theme metadata that describes allowable form and content of theme-authoring data that defines at least one display attribute for at least one user interface component, the system schema file including at least one definition of a plurality of user interface parts, wherein the system schema file comprises:

(1) a theme packager for generating a package theme file based on system theme schema, defined custom theme schema, and a theme authoring file, wherein the theme packager validates the contents of the theme authoring file based on the contents of the system theme schema and the contents of the defined custom theme schema; and (2) a theme manager for re-validating the contents of a theme authoring file;

the system schema file including a definition of a plurality of user interface part states corresponding to at least a respective one of the user interface parts; and the theme authoring file comprising at least one custom theme schema file for extending the system theme schema by adding at least one of: declarations of custom enumerations, custom properties, custom control parts, and custom control part states.

* * * * *